United States Patent [19]

Kilburn

[11] 4,116,279
[45] Sep. 26, 1978

[54] HYDRAULIC BEET HARVESTER
[75] Inventor: Ronald Lee Kilburn, Denver, Colo.
[73] Assignee: H.F.E., Inc., Ft. Collins, Colo.
[21] Appl. No.: 789,077
[22] Filed: Apr. 20, 1977

Related U.S. Application Data

[63] Continuation-in-part of Ser. No. 647,593, Jan. 8, 1976, abandoned.

[51] Int. Cl.² .......................................... A01D 19/02
[52] U.S. Cl. ...................................................... 171/58
[58] Field of Search .................................... 171/55–62; 198/101

[56] References Cited
U.S. PATENT DOCUMENTS

| | | | |
|---|---|---|---|
| 2,944,611 | 7/1960 | Rollins | 171/58 |
| 3,010,522 | 11/1961 | Oppel | 171/58 |
| 3,181,616 | 5/1965 | Oppel | 171/58 |
| 3,809,164 | 5/1974 | Hook et al. | 171/58 |
| 3,968,842 | 7/1976 | Puch, Sr. et al. | 171/61 X |

*Primary Examiner*—Russell R. Kinsey
*Attorney, Agent, or Firm*—Burton & Dorr

[57] ABSTRACT

A novel beet harvesting machine is disclosed having a rectangular frame with a front yoke and longitudinal and transverse support beams and being pulled by a tractor at the yoke for harvesting and delivering beets into a truck. The beet harvesting machine of the present invention utilizes hydraulic motors for powering the flailing of the dug beets rearwardly into the machine, the conveying of the flailed beets further rearwardly in the machine, the delivering of the beets laterally and the elevating of the beets upwardly and into the truck. The reservoir for the hydraulic fluid is integral with and disposed in the center of one of the longitudinal and transverse beams. A pump is provided for delivering the fluid from the reservoir and into the hydraulic motors of the present invention. A cooler for dissipating heat in the fluid is further provided.

18 Claims, 15 Drawing Figures

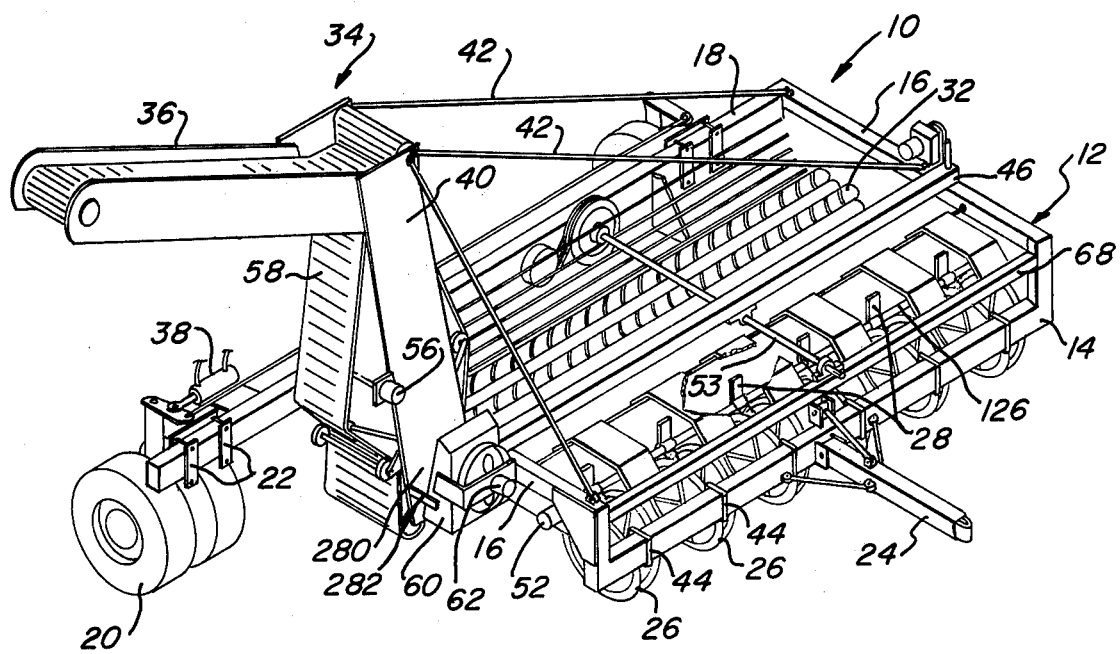
Fig_1
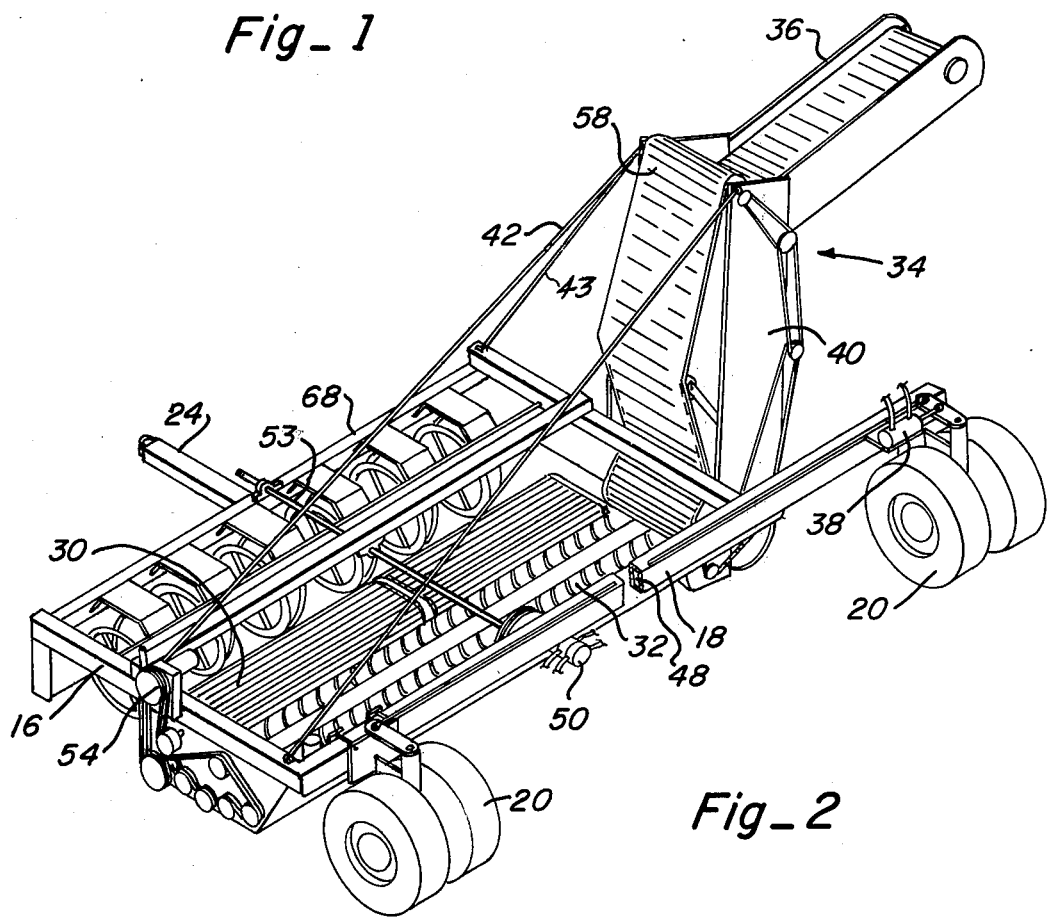
Fig_2

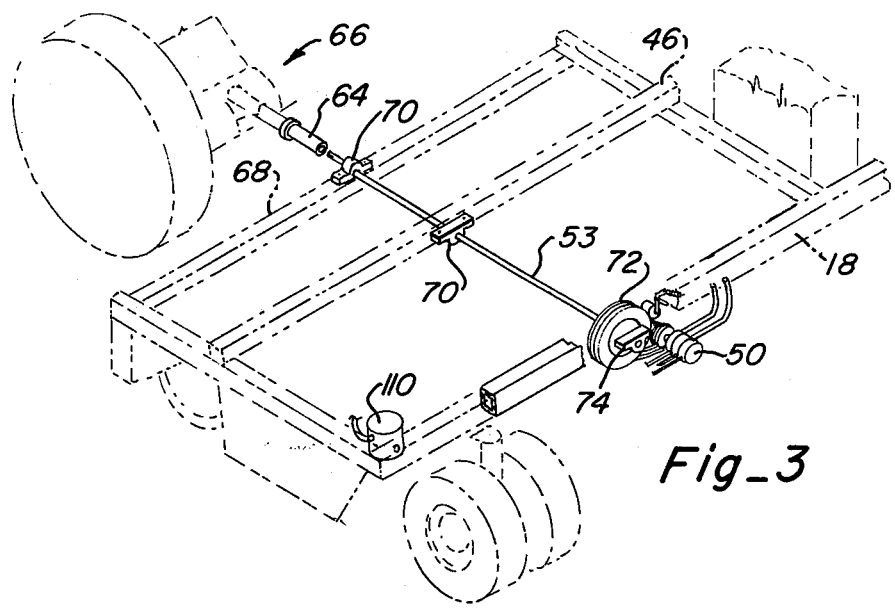
Fig_3
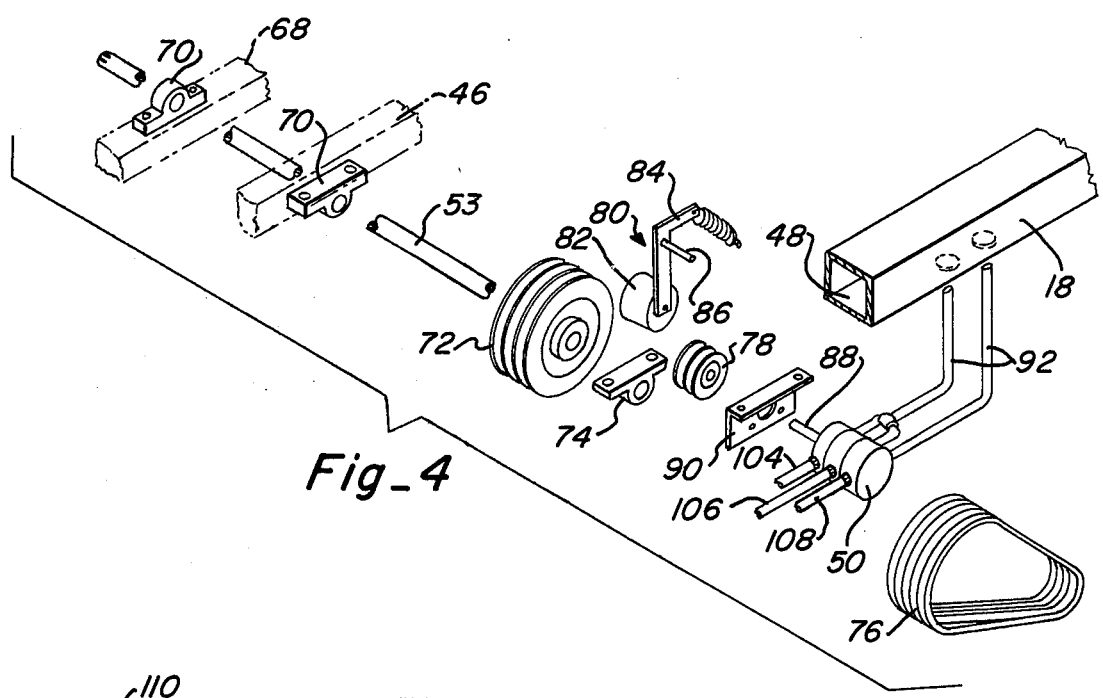
Fig_4
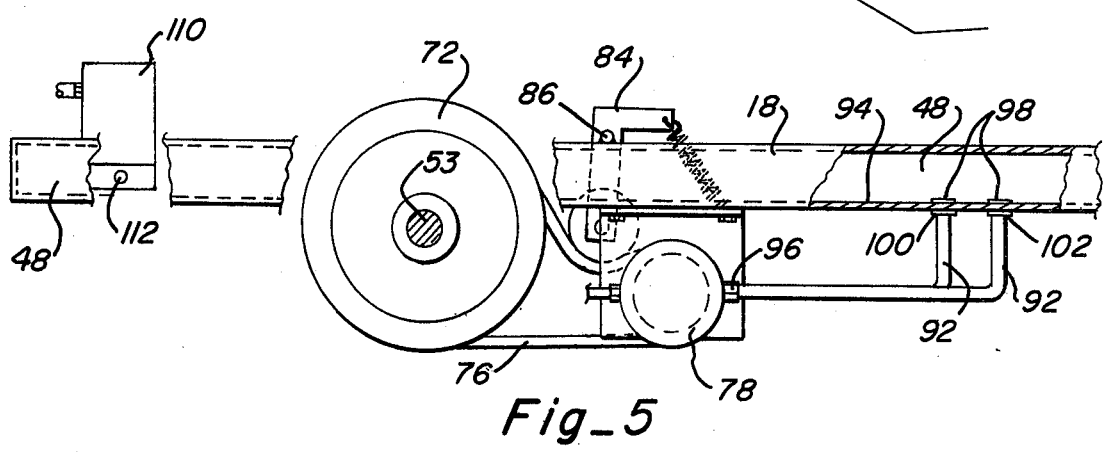
Fig_5

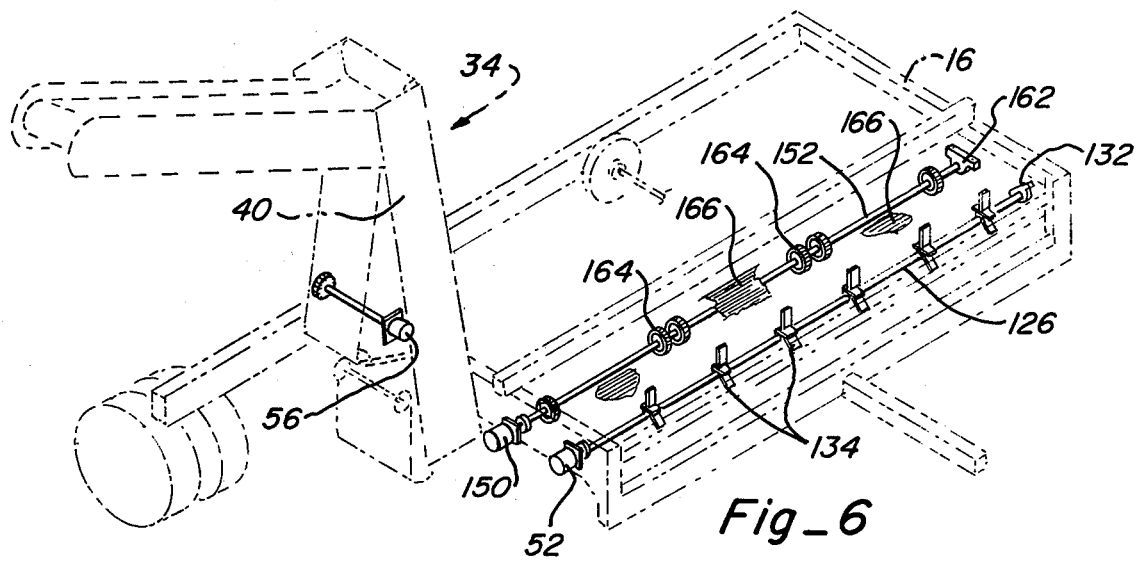
Fig_6
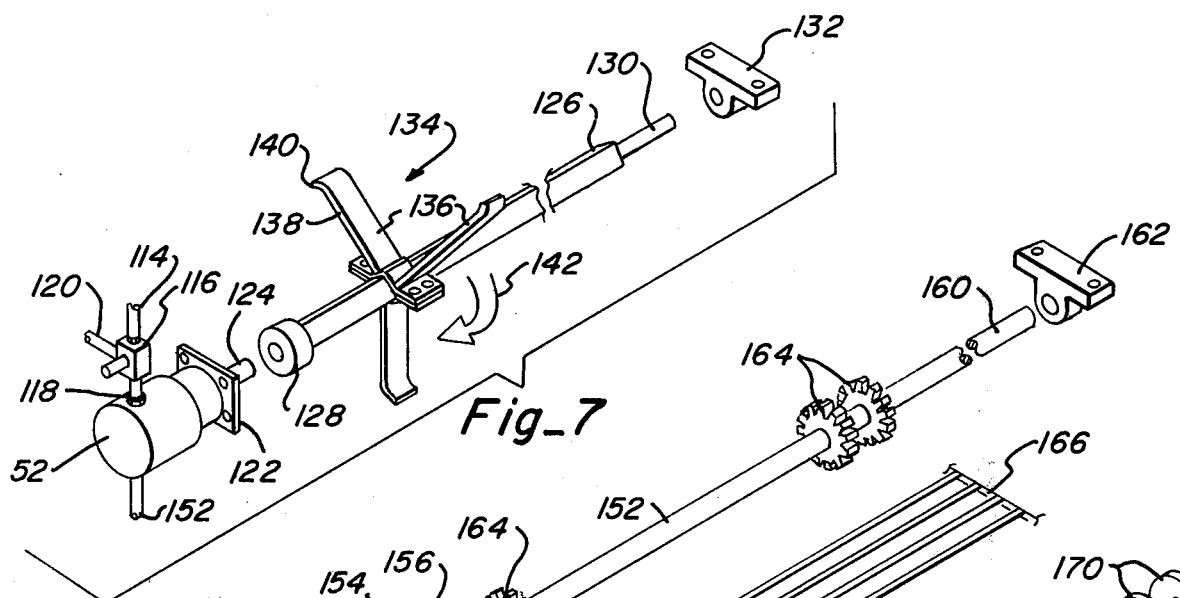
Fig_7
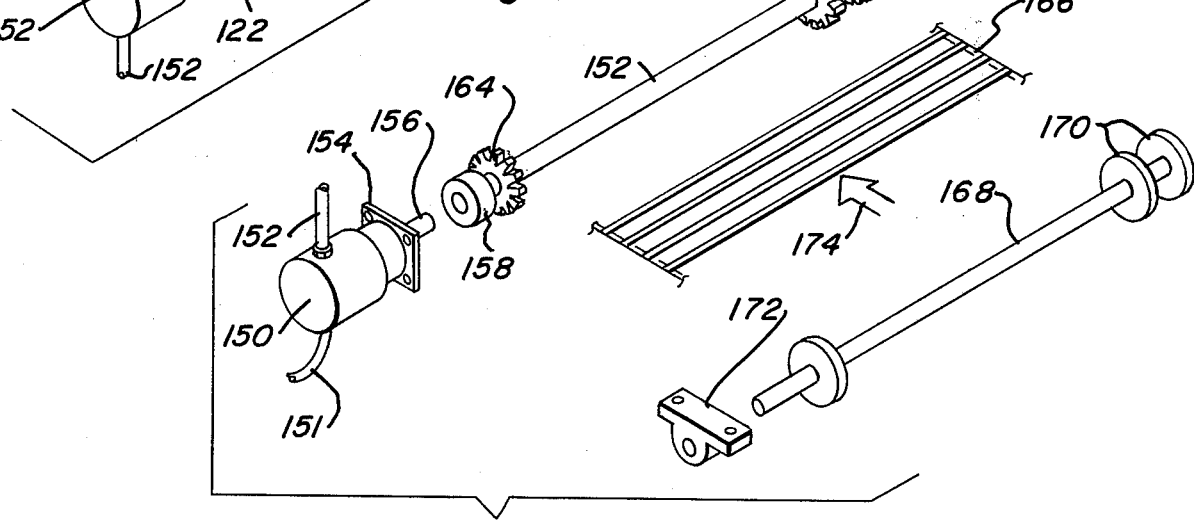
Fig_8

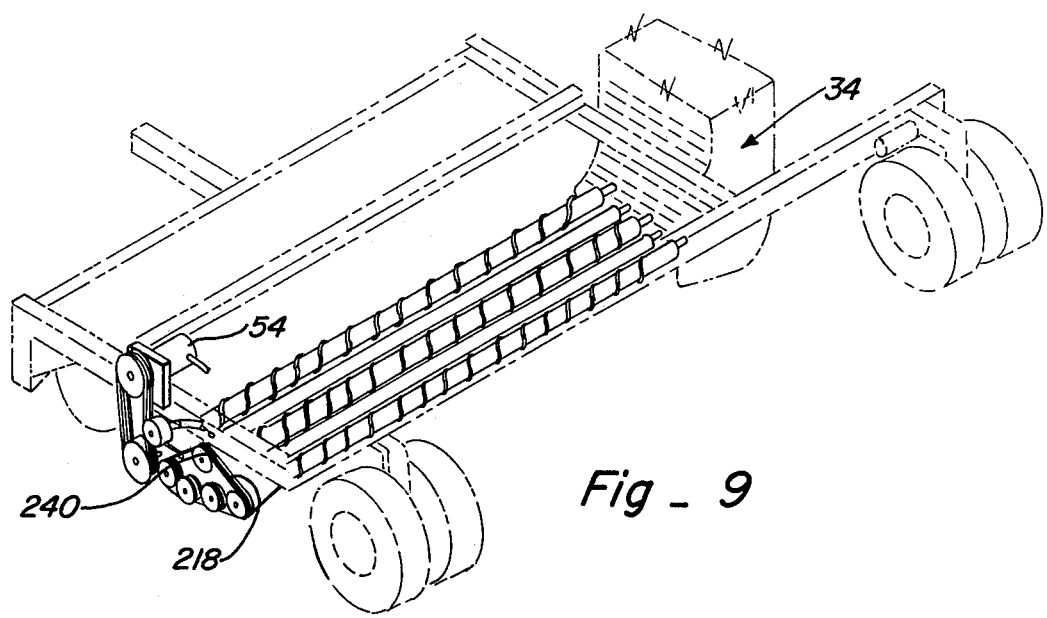
Fig_9
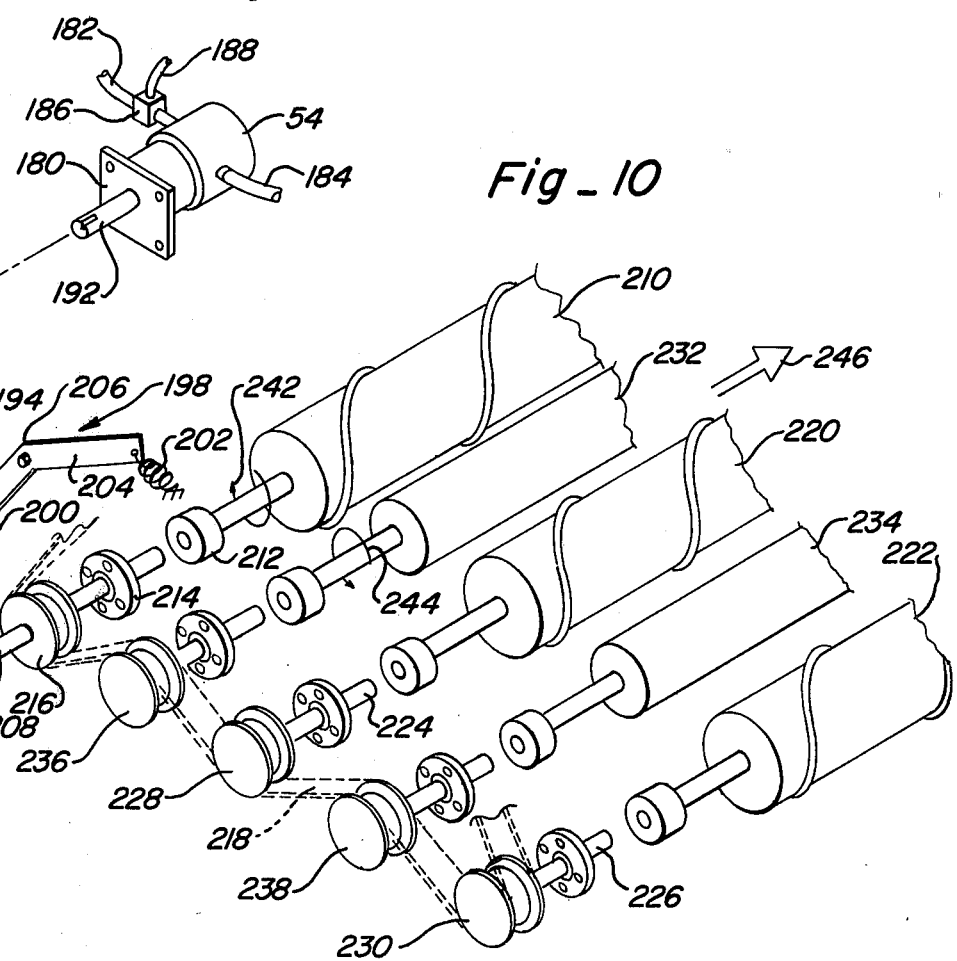
Fig_10

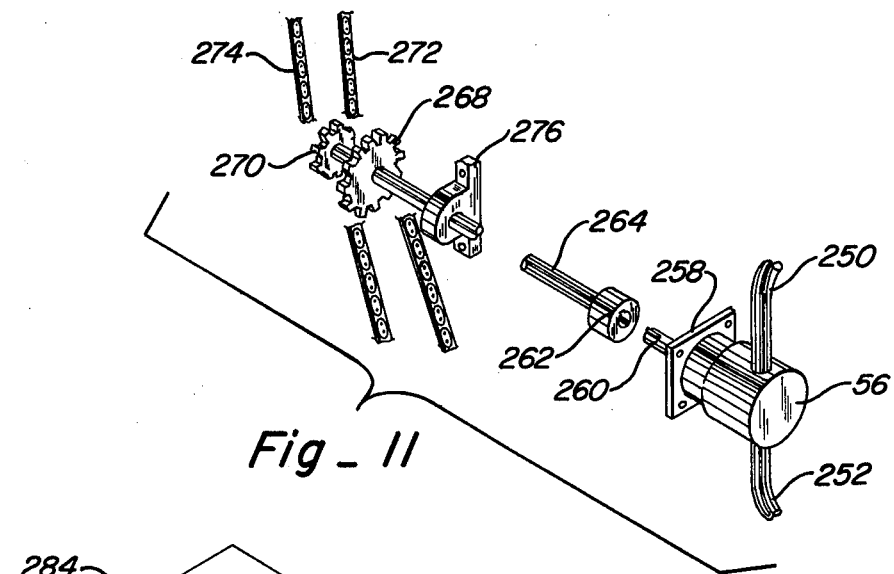
Fig_11
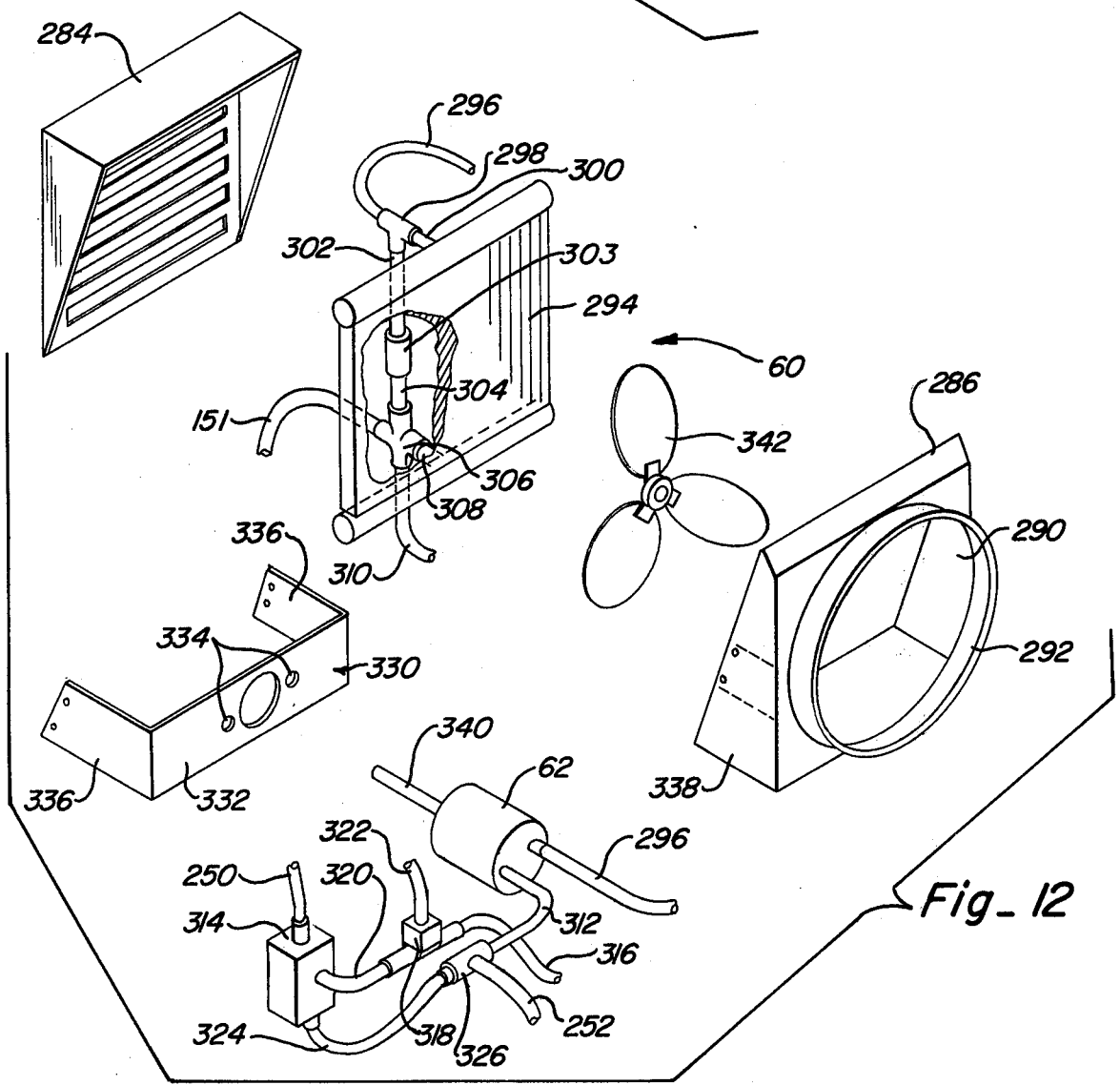
Fig_12

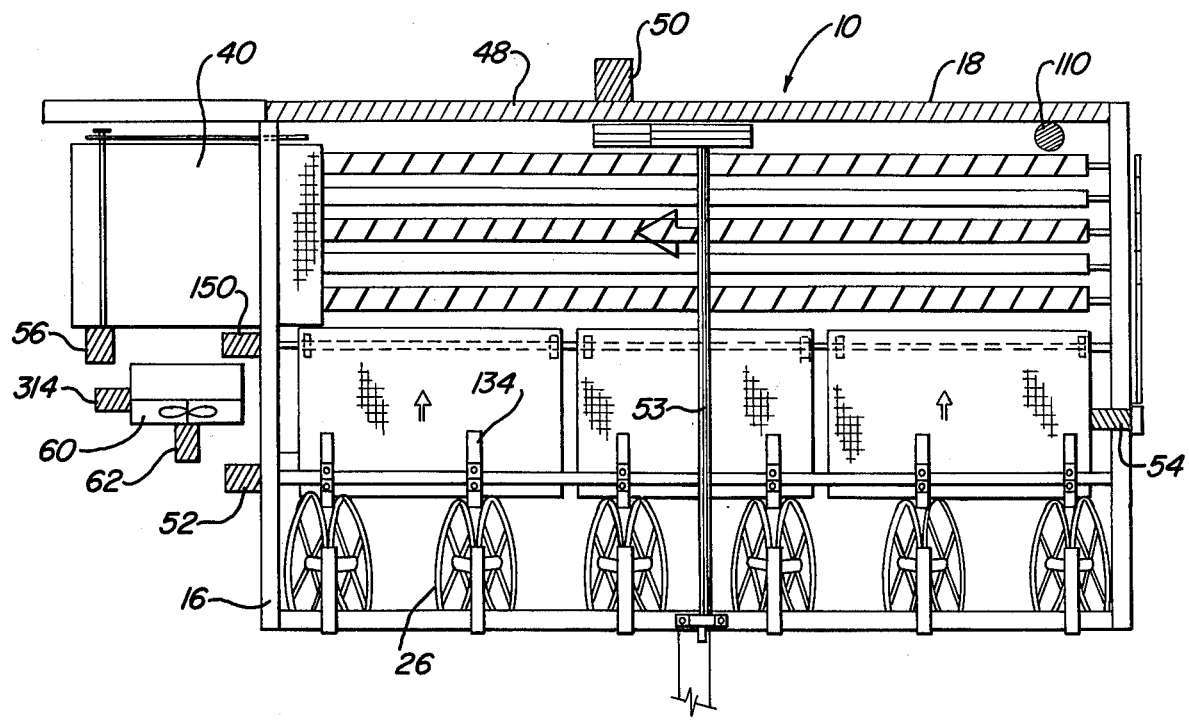
Fig _ 13
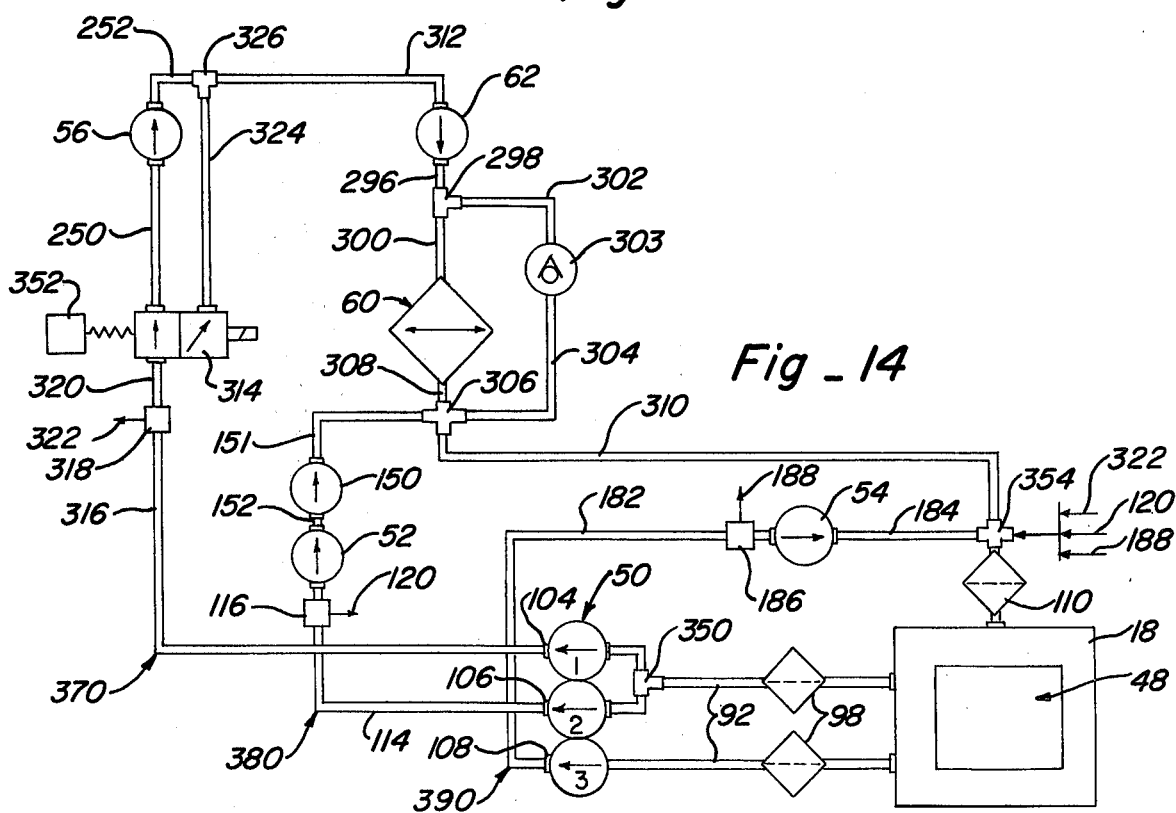
Fig _ 14

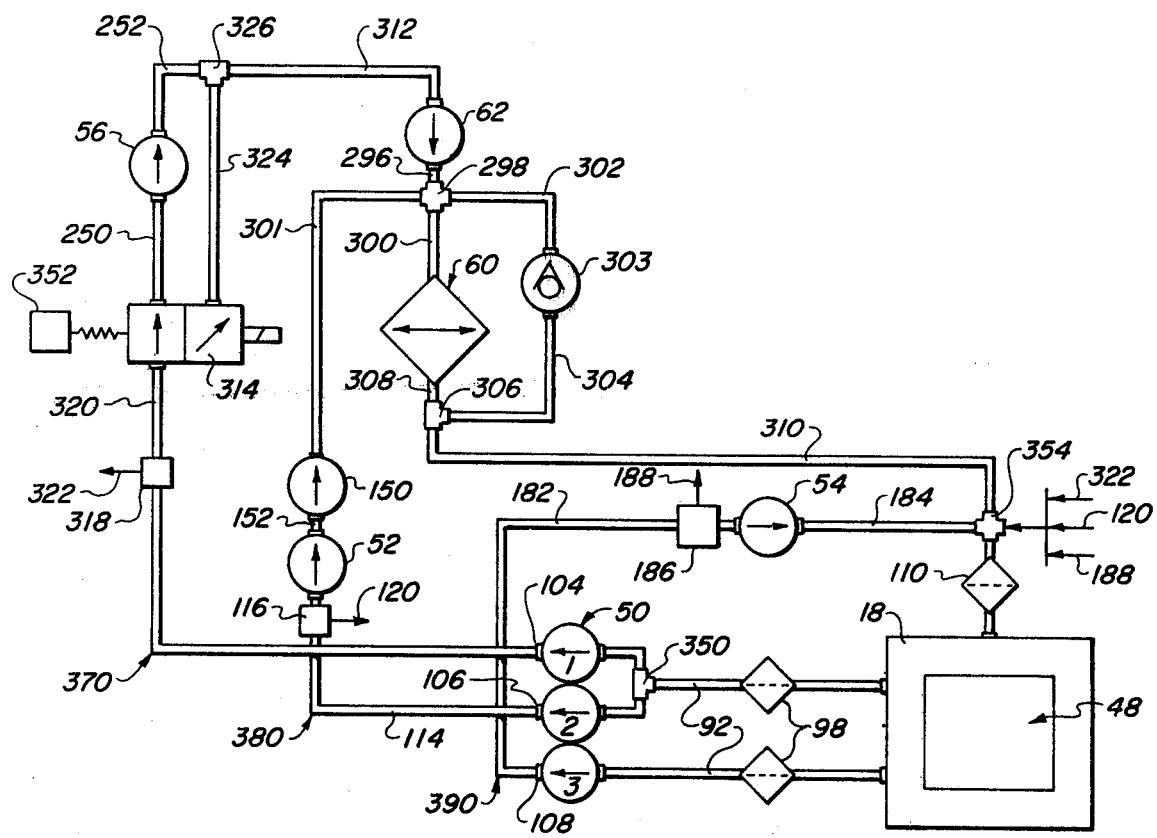
Fig_15

HYDRAULIC BEET HARVESTER

BACKGROUND OF THE INVENTION

1. Scope of the Invention

The present invention relates to beet harvesting equipment.

The present invention relates, in particular, to beet harvesting equipment using hydraulic power.

2. Background of Invention

Numerous conventional beet harvesting machines are known in the art and typically comprise the following elements. A rectangular framework with a front yoke for attachment to a tractor and transverse support beams, means for digging beets upwardly from the ground such as pairs of digging or digger wheels, means operative upon the dug beets for flailing the beets rearwardly into the machine such as kickers, paddles, or flailers; means receptive of the rearwardly flailed beets for conveying the beets rearwardly in the machine such as chain conveyors so that loose dirt and the like can be dropped from the beets; means receptive of the rearwardly conveyed beets for delivering the beets laterally in the machine such as grab rollers or reink bundles; and means receptive of the laterally delivered beets for elevating the beets into a truck such as a vertical elevator or lift with a transfer conveyor belt. The following prior art U.S. Pat. Nos. disclose the above elements: E. C. Rollins, 2,944,611 issued July 12, 1960 entitled "Beet Harvester and Cleaner"; H. C. Oppel, 3,181,616 issued May 4, 1965 entitled "Digging Wheel for Sugar Beet Harvesters"; and H. C. Oppel, 3,010,522 issued Nov. 28, 1961 entitled "Beet Harvester".

All of the above elements require propelling or driving in order to functionally perform. Conventional beet harvesting machines are interconnected to the power-take-off from the tractor wherein a plurality of chains, gears and other assorted power transfer devices are utilized to deliver power to each of the above elements. The disadvantages with conventional prior art approaches is the excessive number of chains and gears required to deliver power to the various elements. The use of chains results in a significant investment in maintenance time for oiling, greasing and adjusting the chains; a significant investment in down time due to breakage of chains and the like; significant wear on the numerous interconnecting drive parts; and significant generation of a large amount of noise. In addition, the use of a multiplicity of gears and chains creates an unsafe and hazardous environment wherein injury to the operator often occurs. Finally, the use of chains and gears results in inefficient power transfer to the moving elements.

The present invention overcomes the above disadvantages through use of a plurality of hydraulic motors selectively positioned to deliver a maximum amount of power for the above elements, thereby eliminating numerous chain drives and gear clusters. The present invention, therefore, reduces machine down time; significantly reduces maintenance time through the elimination of oiling, greasing and adjusting of chains, and provides for increased wear of the remaining parts. The present invention results in a machine with significantly less noise being generated while in use and in a machine which eliminates vibration while delivering more concentrated power for the moving elements. In fact, the present invention due to the concentration of power is capable of greater speed while harvesting, is capable of handling a greater number of rows than conventional machines and finds application in severe soil conditions such as mud or heavy acreage of beets over conventional prior art approaches. The present invention further minimizes the hazardous and unsafe use of chains.

OBJECTS OF THE INVENTION

It is therefore the principal object of the present invention to provide a novel beet harvesting machine.

It is a further object of the present invention to provide a novel beet harvesting machine wherein power is provided directly to the moving elements of the beet harvesting machine without the primary use of chain drives.

It is still a further object of the present invention to provide a novel beet harvesting machine wherein maintenance time and down time is substantially reduced.

It is still a further object of the present invention to provide a novel beet harvesting machine wherein the noise of the machine is substantially reduced.

It is still a further object of the present invention to provide a novel beet harvesting machine wherein vibration of the machine and various parts thereof are greatly reduced.

It is still a further object of the present invention to provide a novel beet harvesting machine wherein greater safety is provided through the substantial elimination of gears and chain drives.

It is still a further object of the present invention to provide a novel beet harvesting machine wherein greater efficiency of harvesting and harvesting in adverse soil and crop conditions are possible through more positive delivery of power to the various moving parts of the machine.

It is still a further object of the present invention to provide a novel beet harvesting machine having a rectangular frame with a front yoke and a rear transverse beam wherein said machine is pulled at the yoke by a tractor for harvesting and delivering beets into a truck. The beet harvesting machine of the present invention having hydraulic motors driving: the means operative upon the dug beets for flailing said beets rearwardly, the means receptive of said rearwardly directed beets for conveying the beets further rearwardly in the machine, the means receptive of the rearwardly conveyed beets for delivering the beets laterally in the machine, and the means receptive of the laterally delivered beets for elevating the beets into a truck.

It is a further object of the present invention to provide hydraulic power for a beet harvesting machine wherein the use of chains and gears is greatly minimized.

It is still a further object of the present invention to provide hydraulic power for driving the kickers, chain conveyors, grab rollers, and elevators of a beet harvestor.

It is still a further object of the present invention to provide a novel beet harvesting machine having hydraulic powered drive elements wherein a cooler connected to the machine cools the hydraulic fluid.

It is still a further object of the present invention to provide a novel beet harvester machine wherein hydraulic power is used to drive the various moving elements of the machine and the fluid for the hydraulic power is stored in a reservoir disposed in the interior of the rear transverse beam so that the reservoir is integral and substantially coextensive with the rear beam.

It is still a further object of the present invention to provide a novel beet harvesting machine having a reservoir on the machine for containing hydraulic fluid, a cooler on the machine for cooling the hydraulic fluid, a pump cooperative with the power-take-off from the pulling tractor for pumping the fluid from the reservoir, a first hydraulic motor connected to the pump for operating the elevator, a second hydraulic motor for propelling air through said cooler so that heat in the fluid is dissipated, a third hydraulic motor connected to the pump for operating the flailer, a fourth hydraulic motor for driving the conveying means, a fifth hydraulic motor connected to the pump for propelling the delivery means, and a solenoid activated dump valve for bypassing the fluid through the elevator motor and into the reservoir so that the elevator can be selectively deactivated.

It is still a further object of the present invention to provide a novel beet harvesting machine having a reservoir integral within and coextensive with a support beam of the framework of the machine for storing hydraulic fluid, a cooler on the machine operative to cool the hydraulic fluid, a three-stage pump cooperative with the power-take-off from the pulling tractor for pumping the fluid from the reservoir, a first hydraulic motor connected to the first stage of the pump for operating the elevator lift, a second hydraulic motor connected in series with the fluid from the first hydraulic motor for propelling air through the cooler, a third hydraulic motor connected to the second stage of the pump for operating a flailing means, a fourth hydraulic motor connected in series with the fluid from the third hydraulic motor for driving the conveying means, a fifth hydraulic motor connected to the third stage of the pump for propelling the delivery means, and a solenoid activated dump valve for selectively bypassing the fluid through the elevator motor.

THE DRAWING

The invention possesses other advantages features, some of which, with the foregoing, will be set forth at length in the following description where those forms of the invention which have been selected for illustration in the drawing accompanying and forming a part of the present specification, are outlined in full. In said drawing, one form of the invention is shown, but it is to be understood that it is not limited to such form, since the invention as set forth in the claims may be embodied in other forms.

Referring to the drawings:

FIG. 1 is a front perspective view of the novel beet harvesting machine of the present invention.

FIG. 2 is a rear perspective view of the beet harvesting machine of the present invention of FIG. 1.

FIG. 3 illustrates in highlighted form a perspective view of the hydraulic pump of the present invention driven by an extender from the power-take-off shaft of the tractor.

FIG. 4 is an exploded perspective view of the power-take-off extender drive and hydraulic pump of the present invention as shown in FIG. 3.

FIG. 5 is a side planar view of the filters and hydraulic pump of the present invention as shown in FIGS. 3 and 4.

FIG. 6 is a highlighted front perspective view of the hydraulic motors for driving the paddles, endless chain conveyor, and the elevators of the present invention.

FIG. 7 is an exploded perspective of the hydraulic paddle motor of the present invention and one set of paddles.

FIG. 8 is an exploded perspective view of the hydraulic chain motor of the present invention for driving the endless chain conveyor.

FIG. 9 is a highlighted perspective view illustrating the grab roller hydraulic motor and the various grab rollers forming a lateral conveyor.

FIG. 10 is an exploded perspective view of the hydraulic grab roller motor of the present invention and the grab rollers.

FIG. 11 is an exploded perspective view showing the hydraulic elevator motor of the present invention and the elevator hugger chains.

FIG. 12 is an exploded perspective view of the cooler hydraulic motor and the cooler of the present invention.

FIG. 13 is a top planar view schematically showing the physical location of the various hydraulic motors of the present invention.

FIG. 14 is a hydraulic schematic of the hydraulic motors and plumbing of the present invention.

FIG. 15 is an alternative hydraulic schematic of the hydraulic motors and plumbing of the present invention.

SUMMARY OF THE INVENTION

The novel beet harvesting machine of the present invention comprises a reservoir for storing hydraulic fluid, a pump activated by the power-take-off of the pulling tractor to pump the hydraulic fluid through the system of the present invention, a cooler interconnected with the fluid flow to dissipate heat in the fluid, and a plurality of drive motors responsive to the pumped fluid for operating a plurality of drive elements found within the beet harvester machine.

The reservoir of the present invention is designed not to interfere with the view of the machine by the operator and is disposed in the interior of one of the transverse support beams of the rectangular frame of the beet harvesting machine. The reservoir is integral and substantially coextensive with the beam. The hydraulic pump is also operatively positioned so as not to interfere with the operator's view and is interconnected to the power-take-off drive from the tractor for effectively transferring the power from the rotation of the power-take-off to the flow of the hydraulic fluid through the system. The pump of the present invention is a three-way pump for delivering fluid into three separate plumbing circuits.

The cooler of the present invention is interconnected into the hydraulic plumbing in order to pass the fluid through radiative vanes thereby dissipating heat being generated in the fluid due to the forcing of the fluid through the system by the three-way hydraulic pump. A fan is provided in order to force atmospheric air through the cooler in order to accelerate cooling of the fluid.

A plurality of hydraulic motors are provided throughout the system for powering the various drive elements within the beet harvester. A first hydraulic motor is connected to one of the three outputs of the pump for operating the elevator which delivers the beets into a truck. A second hydraulic motor is connected in series with the first hydraulic motor and drives the fan for propelling air through the cooler. The output of the second hydraulic motor is delivered back into the reservoir. A third hydraulic motor is connected to the second output from the pump for operating the kicker or paddle wheels. A fourth hydraulic motor is connected in series with the fluid from the third hydraulic motor for driving the draper chain which carries the beets rearwardly in the machine. The output of the fourth hydraulic motor is delivered into the reservoir. A fifth hydraulic motor is connected to the third output of the pump for propelling the grab rollers which deliver the beets laterally across the machine and into the elevator. The output of the fifth hydraulic motor is connected to the reservoir. A solenoid activated dump valve is interconnected in parallel with the first hydraulic motor so that should the operator desire to deactivate the elevator the first hydraulic motor is bypassed and the fluid is directly delivered into the second hydraulic motor.

DESCRIPTION OF THE PREFERRED EMBODIMENT

Referring now to the drawing, and to FIGS. 1 and 2 in particular, a beet harvester 10 is shown as comprising a main supporting framework 12 which includes a front transverse beam 14, side frames 16 extending rearwardly therefrom and a rear transverse beam 18. This main framework 12 carries the several elements which comprise the harvester 10 of the present invention. The framework 12 is supported at the rear by carrier wheels 20 that are secured by clamps 22 to the rear transverse beam 18. The front of the framework 12 is connected to a tractor, not shown, by a yoke 24.

The following elements of the beet harvester 10 are conventional in the art and include pairs of digger or digging wheels 26 for each row of beets to be harvested, flailing means 28 such as kickers or paddles for rearwardly thrusting the dug beets from between each pair of digger wheels, an endless chain or conveyor 30 for transporting the flailed beets rearwardly in the machine, grab rollers 32 for laterally transporting the beets across the machine, and an elevator or lift 34 having an upper extension 36 for delivering the beets from the machine and into a truck, not shown. It is to be understood that the present invention, as will be herein presented, finds application in any number of conventional prior art approaches having some or all of the above features. It is to be further understood that each of the above elements may be specifically designed not only to perform in the above presented manner but also to thoroughly clean and remove dirt, mud, rocks and other materials that may be dug with the beets and delivered into the machine.

The beet harvester 10 of the preferred embodiment shown in FIGS. 1 and 2 further comprises the following conventional elements of slideably adjustable clamps 22 on the rear transverse beam 18 for slideably adjusting the rear carrier wheels 20 in accordance with the row spacing of a particular field. Hydraulic cylinders 38 for turning or steering purposes are provided on the rear carrier wheels 20 and are interconnected with the hydraulic power from the tractor, not shown. The elevator 34 comprises the vertical elevator 40 and an upper elevator extension 36 and elevator brace rods 42 and 43 interconnected at a plurality of locations on the machine to provide support for the elevator 34. As mentioned, the framework 12 of the machine 10 is of rectangular steel construction having a front transverse beam 14 to which are mounted the yoke for connection to the tractor, not shown, and the pairs of digger wheels 26 slideably clamped thereon by clamps and adjustable to conform to particular row widths. Side beams 16 interconnect the front transverse beam 14 with the rear transverse beam 18 to lend support to the system. A middle transverse beam 46 further interconnects the two side beams also to provide additional support for the framework.

As will be more fully discussed, the interior of the rear transverse beam 18 constitutes a reservoir 48 for storing hydraulic fluid. A three-way pump 50 delivers the fluid out from the reservoir 48 under the driving force of a jack shaft 53 transversing the length of the machine which is connected to the power-take-off of the tractor, not shown. The power-take-off from the tractor provides power to drive the three-way pump 59 which in turn pumps fluid into a plurality of hydraulic motors located on the machine. The hydraulic paddle motor 52 operates the above described paddles or kickers 28 which flail the beats rearwardly. The chain conveyor motor, not shown in FIGS. 1 or 2, operates the endless chain conveyor 30 for delivering the beets rearwardly into the machine. The grab roller motor 54, as shown in FIG. 2, rotates the grab rollers 32 for conveying the beets laterally in the machine and into the elevator. The hydraulic elevator motor 56 drives the elevator hugger chains 58 for transporting the beets upwardly from the machine into a truck, not shown. A cooler 60 is provided in the hydraulic plumbing in order to dissipate the heat in the hydraulic fluid created by pumping the fluid through the system at high pressures. A hydraulic cooler motor 62 is provided in order to propel air through the cooler thereby accelerating the removal of heat from the fluid.

In order to simplify the following discussion as much as possible yet in order to provide a full disclosure for one skilled in the art, the various conventional mounting components such as gib head keys, nuts, bolts, cotter pin, spacers, bearings, brackets, bushings, and so forth are well known in the art of beet harvester design and any reference to them will be excluded. The three-way pump 50 is shown in FIG. 3 to be driven by the power-take-of through an interconnecting jack shaft 53. FIG. 3 shows the jack shaft 53 to be substantially in line with the center of the machine and to be in line with the power-take-off 64 from the tractor 66. The jack shaft 53 is connected to a front transverse support beam 68 and the mid-transverse beam 46 by means of bearing supports 70. The jack shaft 53 as shown in FIGS. 4 and 5 supports a large upper sheave 72 and terminates in a pillow block 74. Disposed around the large sheave 72 is a continuous V-belt 76 interconnecting with a smaller sheave 78. The pillow block 74 supporting the end of the jack shaft 53 and the sheave 72 can be conventionally mounted to the rear transverse beam 18 with a conventional U-bracket or the like not shown. An idler 80 engages the continuous V-belt 76 in order to constantly bias the V-belt 76 and to take up any slack therein. The idler 80 comprises a cylindrically shaped flat sheave 82 engaging the belt 76 in a manner as shown in FIG. 5. The flat sheave 82 is rotatably connected to a bias arm 84. The bias arm 84 at the end opposing the flat sheave is spring loaded to continually apply pressure through the pivot point 86 onto the flat sheave 82.

The smaller sheave 78 connects to the drive shaft 88 of the three-stage pump 50. The three-stage pump 50 is conventionally mounted to the bottom of the transverse rear beam by an angle mount 90. The three-stage pump 50 is conventional. The three-stage pump 50 receives hydraulic fluid from the reservoir by means of delivery hoses 92 sealably coupled with the bottom 94 of the reservoir 48 at inputs 96 to the pump 50. Th reservoir 48 is integral and coextensive with the interior of the rear transverse beam 18, while maintaining the beam 18 structurally strong to provide full support for the framework of the machine 10. Strainers 98 are inserted in the hose connections with the reservoir 48 to prevent any foreign objects from entering the hydraulic circuit of the present invention. Pipe couplings 100 sealably engage the reservoir 48 and engage hose nipples 102 for connection to the delivery hoses 92. The three-stage pump delivers hydraulic fluid at three separate hoses 104, 106 and 108.

Filter 110 is provided at the fluid return input 112 to the reservoir 48 to remove any particulate matter from the fluid. Preferably the filter 110 has finer mesh than the mesh of the strainer 98 so that the filter 110 is the primary filter for the system. Filter 110 is conventionally mounted to the rear transverse beam 18.

In operation, the power in the power-take-off 64 from the tractor 66 is conventionally coupled to the jack shaft for driving the three-stage pump 50. The three-stage pump 50 delivers low pressure fluid from the reservoir 48 integral with the rear transverse beam 18 into three hydraulic circuits 104, 106, and 108. The hydraulic pump 50 and the larger and smaller sheaves 72 and 78, respectively, are positioned behind and beneath the rear transverse beam 18 in order to minimize any interference in a visual analysis of the operation of the beet harvester by the operator positioned on a tractor. It is to be understood that the above location of the pump 50 and reservoir 48 is preferable but other suitable locations may be used. For example, the reservoir may be positioned integral and coextensive with the front transverse beam 14 and the power-take-off could directly drive the three-stage pump 50 which may also be mounted on the front beam 14. In this configuration, the jack shaft 53 and the sheave and belt arrangement would be eliminated.

The hydraulic paddle motor for driving the paddles or kickers 28 which flail the dug beets from between each pair of digger wheels 26 is shown in FIGS. 6 and 7. Hydraulic fluid is delivered into the paddle motor 52 which, like all of the subsequently described hydraulic motors, is a conventional hydraulic motor. Hydraulic fluid is delivered from the second line 106 of the pump 50 through hose 114 into a relief valve 116 connected at the hydraulic fluid input 118 of the paddle motor. The relief valve 116 is a conventional valve. Should the pressure in the delivery hose 114 to the paddle motor 52 exceed a certain predetermined value, the relief valve 116 bleeds the excess hydraulic fluid from the delivery hose 114 into a relief hose 120 for delivery back into the reservoir 48 as will be subsequently described. The paddle motor 52 is conventionally mounted, not shown, to the left side support beam 16 by attachment to the mounting plate 122. The drive shaft 124 of the paddle motor 52 interconnects with the paddle shaft 126 with a conventional coupler 128. The other end 130 of the paddle shaft 126 terminates in a pillow block 132 mounted to the right side transverse beam 16. Disposed along the longitudinal extend of the paddle shaft 126 are a plurality of paddles or kickers 28 oriented so that one set of paddles 134 is disposed between each pair of digger wheels 26 as shown in FIG. 13. Each set of paddles 134 is comprised of three protruding members 136 disposed at 120° intervals from each other and conventionally connected to the paddle shaft 126 as shown in FIG. 7. The protruding member 136 is designed in the preferred embodiment to be a linearly extending flat rectangular member 138 having a slight arcuate turn at the extended end 140. The paddles 134 are designed to rotate in a clockwise direction as indicated by the arrow 142. The paddles 134 are disposed at the upper rear region of the machine 10 behind the digger wheels 26.

In operation, hydraulic fluid is delivered from the pump 50 into the paddle motor 52. Should any binding of the paddles occur due, for example, to the presence of a rock, then fluid pressure builds up in the delivery hose. Such pressure build-up can cause damage to the motor or hose, if the pressure was not relieved through relief valve 116.

The chain conveyor motor 150 shown in FIGS. 6 and 8 is connected in series with the hydraulic system from the paddle motor 52 via hose 152. The fluid from the chain motor 150 is delivered into a return hose 151. The motor 150 is conventionally mounted to be in line with the drive shaft 152 by means of a conventional protruding angle or U-shaped bracket, not shown, but attachable to a corresponding mounting plate 154 on the hydraulic motor 150. The drive shaft 152 is coupled to the drive 156 from the chain motor 150 by means of a conventional coupler 158 and the drive shaft 152 terminates at the opposing end 160 in a pillow block 162 mounted in a conventional fashion to the right side support beam 16. Disposed at predetermined intervals along the longitudinal length of the chain drive shaft 152 are sprocket gears 164 which engage to drive a draper chain 30 or other similar arrangement for delivery of the beets, after flailing thereof, into the rear portion of the machine 10. The draper chain 30 is an endless chain and engages an idler shaft 168 having idler wheels 170 mounted in a conventional fashion. Both ends of the idler shaft 168 terminate in pillow blocks 172 conventionally mounted on the left and right side support beams 16. In operation, the draper chain 30 is moved rearwardly in the direction of the arrow 174 to transport beets after being kicked out from between the digger wheels by the paddles 134 towards the grab rollers 32. The chain motor 150 and the chain drive shaft 152 for the draper chain 30 is mounted below and rewardly of the paddle motor 52 and paddle shaft 126 as shown in FIG. 6.

The grab roller hydraulic motor 54 is shown in FIGS. 9 and 10 and is mounted on the upper surface of the right side support beam 16 by a conventional mount, not shown, connecting to the mounting plate 180 on the grab roller motor 54. The grab roller motor 54 receives fluid from the third line 108 of the pump 50 through the delivery hose 182. The fluid exiting from motor 54 is delivered into the reservoir 48 through a return hose 184. A relief valve 186 is interconnected to the input hose 182 and should relief occur, the excess fluid is delivered into relief hose 188. An upper drive sheave 190 is conventionally mounted on the drive shaft 192 of the grab roller motor 54 and drives an endless V-belt 194 which engages a lower transfer sheave 196. An idler 198 assembly is provided for the V-belt 194 and is composed of a flat idler sheave 200 for continually and inwardly biasing the V-belt 194 as shown in FIG. 10 to take up any slack therein. The flat idler sheave 200 is biased against the V-belt 194 through the compressive force of a bias spring 202 transmitted through a bias support member 204 pivoted at a substantially midpoint region 206 to side beam 16. The transfer sheave 196 is mounted on the drive shaft 208 of the first spiralled grab roller 210 which is connected thereto by a conventional coupler 212. The drive shaft 208 is mounted to the machine 10 by means of conventional coupling 214. Also mounted on the drive shaft 208 of the first grab roller 210 is a sheave 216 in communication with a second endless V-belt 218. Each of the two remaining grab rollers 220 and 222 are connected to corresponding drive shafts 224 and 226 which mount sheaves 228 and 230. The V-belt 218 is further in communication with non-spiralled grab rollers 232 and 234 via sheaves 236 and 238. The endless V-belt 218 is woven, in the fashion indicated in FIG. 10, between the lower surfaces of the spiralled grab roller sheaves and the upper surfaces of the non-spiralled grab roller sheaves. A return sheave 240, as shown in FIG. 9, provides an upper return of the belt 218. The grab rollers are conventionally mounted to the frame of the machine as shown in FIGS. 1 and 9 and means of couplings 214.

In operation, the spiralled grab rollers are rotated counterclockwise in the direction of arrow 242 while the non-spiralled grab delivered towards the elevator 34 laterally across the machine 10.

The hydraulic elevator motor 56 is shown in FIGS. 6 and 11 and receives incoming hydraulic fluid through delivery hose 250 and delivers hydraulic fluid out from the motor through return hose 252.

The hydraulic elevator motor 56 is conventionally mounted onto the side of the vertical elevator 40 with conventional mounting brackets onto the motor mounting brackets 258. The drive shaft 260 of the hydraulic motor 56 conventionally couples 262 to a hugger chair drive shaft 264 which extends through the vertical elevator 40 to a two gear cluster 268 and 270. The larger gear 268 drives a first hugger chain 272 while the smaller outer gear 270 drives a second hugger chain 274. Hugger chains, 272 and 274, are conventional in the art. A hugger head 276 conventionally attached to the elevator is assembled on the drive shaft 264 to support the apparatus.

The cooler 60 and hydraulic cooler motor 62 are shown in FIGS. 1 and 12. The cooler 60 is mounted by conventional brackets or the like 282 to the front bottom surface 280 of the vertical elevator 40. The cooler 60 is housed in a front releasable cooler mount or cover 286. The cooler mount or cover 286 has centrally disposed on the front surface thereof a large circular opening 290 having disposed therearound a protruding lip or rim 292. A cooling radiator 294 mounted within the housing 284 is designed to receive hydraulic fluid through an input hose 296 into a connecting T-connector 298 to a nipple 300 in communication with the input of the radiator 294. The T-connector 298 is further coupled to a pipe 302 that is connected to a check valve 303 which in turn is connected through a nipple 304 to a cross-connector 306. One input of the cross-connector 306 is connected through a nipple 308 from the output of the radiator 294. The check valve 303 is connected, therefore, in parallel with the fluid flow through the radiator 294. The radiator 294 is conventional and the check valve is also conventional. Should cooling vanes within the radiator 294 become plugged or blocked any pressure build-up is relieved by activation of the check valve 303. The cross connector 306 further connects fluid input from hose 151 from the chain motor 150 and couples that flow with the flow from the previously discussed cooler flow into an output hose 310.

The hydraulic cooler motor 62 of the present invention receives hydraulic fluid input through hose 312 and delivers hydraulic fluid outwardly through hose 296 into the cooler 60. A dump valve 314 is interconnected in parallel with the elevator motor 56 as follows. Delivery hose 316 is connected to the first output 104 of pump 50 and terminates in a connection with relief valve 318. The output of the relief valve 318 is connected through hose 320 to the input of the dump valve 314. A relief hose 322 is connected to the relief valve 318. The first output of the dump valve 314 is connected through hose 250 to the elevator motor 56. The second output of the dump valve 314 is connected through hose 324 to a T-connector 326. The T-connector 326 is further connected to the hose 252 which is the output from motor 56. The output of the T-connector 326 is delivered through hose 312 to drive the cooler motor 62. The hydraulic cooler motor 62 is mounted to the cooler mount or cover 286 by means of a motor mount bracket 330 of the configuration shown in FIG. 12. The motor mount bracket 330 comprises a rectangular front surface 332 of substantially the width of the cooler mount or cover 286. Disposed in the center thereof are mounting holes 334 for mounting the hydraulic cooler motor 62 to the motor mount 330. The sides of the motor mount 336 extend rearwardly and are in close parallel relationship with the sides 338 of the cooler mount or cover as shown by the dotted lines thereon. The drive shaft 340 of the motor 62 couples to a three bladed fan 342. In operation, therefore, the motor and mount 330 fixedly attaches to the cooler mount or cover 286 and positions the motor 62 and the fan 342 centrally in the large circular opening 290. Air is delivered from the atmosphere and forced through the cooling vanes, not shown, of the radiator 294 in order to dissipate any heat found within the hydraulic fluid.

Another preferred mode of operation effectuates greater cooling of the fluid as shown in FIG. 15. In this mode of operation segment segment 301 enables the fluid from motors 120 and 150 to flow into cooler 60 rather into reservoir 48.

The operation of the hydraulic system of the present invention is made by reference to FIGS. 13 and 14. In FIG. 13, the physical placement of the various elements of the present hydraulic system are physically and schematically represented. The power-take-off transfer shaft 53 is centrally located in the center main part of the machine 10 and delivers rotational power rearwardly to drive the hydraulic pump 50. The hydraulic pump 50 in turn delivers fluid from the reservoir 48 located internally and integral with the rear transverse beam 18. The three-way hydraulic pump 50, as shown in FIG. 14, has stages 1 and 2 interconnected at a T-connector 350 to draw fluid from the reservoir 48 through a strainer 98 connected at the output of the reservoir 48. Stage 3 of the hydraulic pump 50, independently of the first two stages, draws fluid from the reservoir 48 through a second output strainer 98. The output 104 of the first stage of the three-way hydraulic pump 50 is delivered through an interconnecting hose 316 into relief valve 318 and thence through hose 320 to the inlet of the dump valve. The dump valve is attached to the side of the cooler housing 284 as shown in FIG. 13. The dump valve 314 is under electrical control 352 by the operator on the tractor. The outlet of the elevator motor 56 is delivered over a hose 252 to a T-connector 326 and then through hose 312 to the inlet of the cooler motor 62. The second output of the dump valve 314 is delivered through hose 324 into T-connector 326. The elevator motor 56 is mounted on the front left hand side disposed above the cooler 60 on the elevator 40. The outlet of the cooler motor 62 is delivered into a cross-connector 298. The cooler motor, as previously discussed, is mounted in front of the cooler 60. The first outlet of the T-connector 298 is delivered over hose 302 to a check valve 303 whose outlet is delivered over a hose 304 to a first inlet of a second cross-connector 306. The second outlet of the T-connector 298 is delivered through a hose 300 to the inlet of cooler 60. The outlet of the cooler 60 is connected through a hose 308 to the second inlet of cross-connector 306.

The output 106 of the second stage of the three-way pump 50 is delivered over hose 114 to the relief valve 116 and thence to the inlet of the paddle motor 52. The paddle motor 52 is located on the front portion of the left side support beam 16. The outlet of the paddle motor 52 is delivered through an interconnecting hose 152 to the inlet of the chain motor 150 which is located rearwardly and below the paddle motor 52. The outlet of the chain motor 150 is delivered through a hose 151 to the third inlet of the cross-connector 306. The output of the cross-connector 306 is delivered through a hose 310 to the input to cross-connector 354.

The output 108 of the third stage of the three-stage hydraulic pump 50 is delivered over hose 182 to relief valve 186 and thence to the input of the grab roller motor 54. The output of the grab roller motor 54 is delivered over hose 184 to the second inlet of the cross-connector 354. The relief hoses 322, 120, and 188 from relief valves 318, 116 and 186 respectively are delivered into cross-connector 354. The output of the cross-connector 354 is delivered through an interconnecting hose to the input of the filter 110. The output of the filter 110 is conventionally interconnected to the input of the reservoir, as previously discussed.

In operation, the reservoir 48 disposed within the rear transverse beam preferably contains twenty gallons of hydraulic fluid. The three-stage pump 50 delivers the fluid preferably at the rate of 70 gallons per minute. Therefore, fluid flows through the reservoir 48 loading and emptying 3.5 times a minute. The output 104 of the first stage of the hydraulic pump is 17½ gallons per minute, the output 106 of the second stage of the hydraulic pump is preferably 17½ gallons per minute, while the output 108 of the third stage of the hydraulic pump 50 is preferably 35 gallons per minute. Such flow rates cause the temperature of the fluid to increase. Generally at 180° to 190° Fahrenheit hydraulic fluid starts to foam and the metal within the pump 50 may cavitate. It is therefore important, that a cooler of adequate capacity be interconnected into the hydraulic flow to thoroughly and adequately dissipate any heat build up within the fluid. The first stage of the hydraulic pump 50 drives a first hydraulic circuit 370 containing the dump valve 314, the elevator motor 56, the cooler motor 62, and the cooler 60. In the event that the operator on the tractor wishes to disengage the elevator from the hydraulic system when, for example, one truck is filled with beets and a second truck must be positioned; the operator by activating an electric switch 352 on the tractor operates a solenoid to activate dump valve 314 to bypass the flow of hydraulic fluid from flowing through the elevator motor 56. The second stage of the hydraulic pump delivers hydraulic fluid through a second hydraulic circuit 380 comprised of a series connection of the paddle motor 52 and the chain motor 150. And finally, the third stage of the pump delivers hydraulic fluid through a third hydraulic circuit 390 comprised only of the grab roller motor 54. The elevator motor 56 preferably rotates between 200-400 RPM, the paddle motor 52 preferably rotates between 100-300 RPM, the cooler motor 62 preferably rotates between 800-1600 RPM, the chain motor 150 preferably rotates between 100-400 RPM, and the grab roller motor preferably rotates between 300-600 RPM.

The above three separate hydraulic circuits are preferable over using one hydraulic circuit. If one hydraulic circuit is used, the hydraulic pump would be too large for practical use on the machine. In addition, since the fluid pressure is always greatest at the outlet of the pump, the above-described five pumps connected in series would have the greatest amount of power delivered to the first motors and a lower amount to the remaining motors. By using three hydraulic circuits an overall smaller pump is provided and the power is uniformly distributed to the motors. In the preferred approach, therefore, the power from the hydraulic fluid is substantially concentrated at the various moving elements thereby enabling the machine of the present invention to effectively travel through adverse crop and soil conditions such as heavy beet yields and/or muddy soil. The concentrated power further eliminates the shimmying or vibration inherent in chain driven machines.

While certain illustrative embodiments of the present invention have been shown in the drawings and described above in considerable detail, it should be understood that there is no intention to limit the invention to the specific form disclosed. On the contrary, the intention is to cover all modification, alternative constructions, equivalents and uses following within the spirit and scope of the invention as expressed in the appended claims. At the present time, the preferred mode is that shown in FIG. 14 with segment 301 (dotted lines) inserted in lieu of segment 305.

I claim:

1. In a beet harvesting machine having a rectangular frame with longitudinal and transverse support beams and a front yoke, said machine being pulled at said yoke by a tractor for harvesting and delivering beets into a truck having means located on said frame for digging beets upwardly from the ground, means located on said frame operative on said dug beets for flailing said beets rearwardly, means located on said frame receptive of said rearwardly directed beets for conveying said beets further rearwardly in said machine, means located on said frame receptive of said rearwardly conveyed beets for delivering said beets laterally in said machine, and means located on said frame receptive of said laterally delivered beets for elevating said beets into said truck, the improvement to said machine comprising:

a reservoir disposed in the interior of one of said beams and substantially coextensive therewith for containing hydraulic fluid, first means, in fluid communication with said reservoir and cooperative with the power-take-off of said tractor, for pumping a first portion of said fluid from said reservoir to drive said elevating means, second means, in fluid communication with said reservoir and cooperative with the power-take-off of said tractor, for pumping a second portion of said fluid from said reservoir to drive said flailing means and said conveying means, and third means, in fluid communication with said reservoir and cooperative with the power-take-off of said tractor, for pumping a third portion of said fluid from said reservoir to drive said delivering means.

2. In a beet harvesting machine having a rectangular frame with longitudinal and transverse support beams and a front yoke, said machine being pulled at said yoke by a tractor for harvesting and delivering beets into a truck having means located on said frame for digging beets upwardly from the ground, means located on said frame operative on said dug beets for flailing said beets rearwardly, means located on said frame receptive of said rearwardly directed beets for conveying said beets further rearwardly in said machine, means located on said frame receptive of said rearwardly conveyed beets for delivering said beets laterally in said machine, and means located on said frame receptive of said laterally delivered beets for elevating said beets into said truck, the improvement to said machine comprising:
- a reservoir disposed in the interior of one of said beams and substantially coextensive therewith for containing hydraulic fluid,
- means in fluid communication with said reservoir and cooperative with the power-take-off of said tractor, for pumping said fluid out of said reservoir,
- a cooler on said machine receptive of at least a portion of said pumped fluid for cooling said pumped fluid,
- first means receptive of at least a portion of said pumped fluid for driving said flailing means,
- second means receptive of at least a portion of said pumped fluid for driving said conveyed means,
- third means receptive of at least a portion of said pumped fluid for driving said delivery means, and
- fourth means receptive of at least a portion of said pumped fluid for driving said elevating means.

3. A beet harvesting machine having a rectangular frame with a front yoke and transverse beams, said machine being pulled at said yoke by a tractor for harvesting and delivering beets into a truck, said beet harvesting machine comprising:
- a reservoir connected to said machine for containing hydraulic fluid,
- means in fluid communication with said reservoir and cooperative with the power-take-off of said tractor for pumping said fluid from said reservoir,
- a cooler connected to said machine and in fluid communication with said pumped fluid for cooling said fluid,
- means attached to said frame for digging beets upwardly from the ground,
- first means attached to said frame responsive to said pumped fluid and operative on said dug beets for flailing said beets rearwardly, said first means being in fluid communication with said reservoir,
- second means attached to said frame responsive to said pumped fluid and receptive of said rearwardly flailed beets for conveying said beets rearwardly, said second means being in fluid communication with said reservoir,
- third means attached to said frame responsive to said pumped fluid and receptive of said rearwardly conveyed beets for delivering said beets laterally in said machine, said third means being in fluid communication with said reservoir, and
- fourth means attached to said frame responsive to said pumped fluid and receptive of said laterally delivered beets for elevating said beets into said truck, said fourth means being in fluid communication with said reservoir.

4. A beet harvesting machine having a rectangular frame with a front yoke and transverse beams, said machine being pulled at said yoke by a tractor for harvesting and delivering beets into a truck, said beet harvesting machine comprising:
- a reservoir connected to said machine for containing hydraulic fluid,
- means in fluid communication with said reservoir and cooperative with the power-take-off of said tractor for pumping said fluid from said reservoir,
- a cooler connected to said machine and in fluid communication with said pumped fluid for cooling said fluid,
- means attached to said frame for digging beets upwardly from the ground,
- first means attached to said frame responsive to said pumped fluid and operative on said dug beets for flailing said beets rearwardly, said first means being in fluid communication with said reservoir,
- second means attached to said frame responsive to said pumped fluid and receptive of said rearwardly flailed beets for conveying said beets rearwardly, said second means being in fluid communication with said reservoir,
- third means attached to said frame responsive to said pumped fluid and receptive of said rearwardly conveyed beets for delivering said beets laterally in said machine, said third means being in fluid communication with said reservoir,
- fourth means attached to said frame responsive to said pumped fluid and receptive of said laterally delivered beets for elevating said beets into said truck, said fourth means being in fluid communication with said reservoir, and
- fifth means responsive to said pumped fluid for propelling air through said cooler.

5. A beet harvesting machine having a rectangular frame with a front yoke and transverse beams, said machine being pulled at said yoke by a tractor for harvesting and delivering beets into a truck, said beet harvesting machine comprising:
- a reservoir connected to said machine for containing hydraulic fluid, wherein said reservoir is disposed in the interior of one of said beams, said reservoir being further integral and substantially coextensive with the aforesaid beam,
- means in fluid communication with said reservoir and cooperative with the power-take-off of said tractor for pumping said fluid from said reservoir,
- a cooler connected to said machine in fluid communication with said pumped fluid for cooling said fluid,
- means attached to said frame for digging beets upwardly from the ground,
- first means attached to said frame responsive to said pumped fluid and operative on said dug beets for flailing said beets rearwardly, said first means being in fluid communication with said reservoir,
- second means attached to said frame responsive to said pumped fluid and receptive of said rearwardly flailed beets for conveying said beets rearwardly, said second means being in fluid communication with said reservoir,
- third means attached to said frame responsive to said pumped fluid and receptive of said rearwardly conveyed beets for delivering said beets laterally in said machine, said third means being in fluid communication with said reservoir, and fourth means attached to said frame responsive to said pumped fluid and receptive of said laterally delivered beets for elevating said beets into said truck, said fourth means being in fluid communication with said reservoir.

6. A beet harvesting machine having a rectangular frame with a front yoke and transverse beams, said machine being pulled at said yoke by a tractor for harvesting and delivering beets into a truck, said beet harvesting machine comprising:

a reservoir connected to said machine for containing hydraulic fluid, means in fluid communication with said reservoir and cooperative with the power-take-off of said tractor for pumping said fluid from said reservoir, a cooler connected to said machine in fluid communication with said pumped fluid for cooling said fluid, means attached to said frame for digging beets upwardly from the ground, first means attached to said frame responsive to said pumped fluid and operative on said dug beets for flailing said beets rearwardly, said first means being in fluid communication with said reservoir, second means attached to said frame responsive to said pumped fluid and receptive of said rearwardly flailed beets for conveying said beets rearwardly, said second means being in fluid communication with said reservoir, third means attached to said frame responsive to said pumped fluid and receptive of said rearwardly conveyed beets for delivering said beets laterally in said machine, said third means being in fluid communication with said reservoir, fourth means attached to said frame responsive to said pumped fluid and receptive of said laterally delivered beets for elevating said beets into said truck, said fourth means being in fluid communication with said reservoir, and means in fluid communication with said reservoir responsive to the pressure of the pumped fluid from said pumping means for delivering said pumped fluid into said reservoir when said pressure exceeds a predetermined amount.

7. A beet harvesting machine having a rectangular frame with a front yoke and transverse support beams, said machine being pulled at said yoke by a tractor for harvesting and delivering beets into a truck, said beet harvesting machine comprising:

means attached to said frame for digging upwardly from the ground, means attached to said frame and operative on said dug beets for flailing said beets rearwardly, means attached to said frame and receptive of said rearwardly directed beets for conveying said beets further rearwardly in said machine, means attached to said frame and receptive of said rearwardly conveyed beets for delivering said beets laterally in said machine, means attached to said frame and receptive of said laterally delivered beets for elevating said beets into said truck, a reservoir on said frame for containing hydraulic fluid, a cooler on said frame for cooling said fluid, a pump cooperative with the power-take-off from said tractor for pumping said fluid from said reservoir, a first hydraulic motor connected to said pump for operating said elevation means, a second hydraulic motor connected in series with the fluid from said first hydraulic motor for propelling air through said cooler so that heat in said fluid in said cooler is dissipated, means interconnected with the fluid output of said second motor for delivering the aforesaid fluid into said cooler, a third hydraulic motor connected to said pump for operating said flailing means, a fourth hydraulic motor connected in series with the fluid from said third hydraulic motor for driving said conveying means, means interconnected with the fluid output of said fourth motor for delivering the aforesaid fluid into said reservoir, a fifth hydraulic motor connected to said pump for propelling said delivery means, means interconnected with the fluid output of said fifth motor for delivering the aforesaid fluid into said reservoir, and means interconnected with the fluid output of said cooler for delivering the aforesaid fluid into said reservoir.

8. The machine of claim 7 further comprising means interconnected with the fluid input of said first motor for selectively by-passing the fluid flowing through said first motor.

9. The machine of claim 7 wherein said reservoir is disposed in the interior of one of said beams, said reservoir being integral and substantially coextensive with the aforesaid beam.

10. The machine of claim 7 further comprising means connected with the input to said reservoir for filtering said fluid.

11. The machine of claim 7 further comprising a check valve mounted on said cooler interconnected in parallel with the fluid flow entering said cooler for selectively bypassing the flow of the aforesaid fluid when said cooler becomes plugged, said bypassed fluid being delivered into said reservoir.

12. A beet harvesting machine having a rectangular frame comprising a front yoke and transverse support beams said machine being pulled by a tractor for harvesting and delivering beets into a truck, said beet harvesting machine comprising:

means attached to said frame for digging beets upwardly from the ground, means attached to said frame and operative on said dug beets for flailing said beets rearwardly, means attached to said frame and receptive of said rearwardly directed beets for conveying said beets further rearwardly in said machine, means attached to said frame and receptive of said rearwardly conveyed beets for delivering said beets laterally in said machine, means attached to said frame and receptive of said laterally delivered beets for elevating said beets into said truck, a reservoir disposed in the interior of one of said beams and substantially coextensive therewith for containing hydraulic fluid, a cooler on said machine for cooling said fluid, a pump cooperative with the power-take-off from said tractor for pumping said fluid from said reservoir, a first hydraulic motor connected to said pump for operating said elevation means, a second hydraulic motor connected in series with the fluid from said first hydraulic motor for propelling air through said cooler so that heat in said fluid in said cooler is dissipated, means interconnected with the fluid output of said second motor for delivering the aforesaid fluid into said cooler, a third hydraulic motor connected to said pump for operating said flailing means, a fourth hydraulic motor connected in series with the fluid from said third hydraulic motor for driving said conveying means, means interconnected with the fluid output of said fourth motor for delivering the aforesaid fluid into said reservoir, a fifth hydraulic motor connected to said pump for propelling said delivery means, means interconnected with the fluid output of said fifth motor for delivering the aforesaid fluid into said reservoir, means interconnected with the fluid output of said cooler for delivering the aforesaid fluid into said reservoir, means interconnected between said reservoir and said delivery means interconnected with said cooler for filtering said fluid, means interconnected between said reservoir and said pump for filtering the fluid flowing from said reservoir to said pump, and a check valve interconnected in parallel with the fluid flow through said cooler for selectively bypassing the flow of the aforesaid fluid when said cooler becomes plugged, said bypassed fluid being delivered into said reservoir.

13. In a beet harvesting machine having a rectangular frame comprising a front yoke and transverse side beams, said machine being pulled by a tractor for harvesting and delivering beets into a truck, said beet harvesting machine having means located on said frame for digging beets upwardly from the ground, further means located on said frame operative on said dug beets for flailing said beets rearwardly, means located on said frame receptive of said rearwardly directed beets for conveying said beets further rearwardly in said machine, means located on said frame receptive of said rearwardly conveyed beets for delivering said beets laterally in said machine, and means located on said frame receptive of said laterally delivered beets for elevating said beets into said truck, the improvement to said machine comprising:

a reservoir operatively position on one of said transverse beams for storing hydraulic fluid, a pump operatively positioned on said aforesaid transverse beam for pumping said fluid from said reservoir, means interconnecting the power-take-off from said tractor with said pump for transferring the rotation of said power-take-off to said pump, a first hydraulic motor operatively positioned on said elevator and connected to said pump for operating said elevation means, a cooler operatively positioned on said machine and receptive of air for cooling said fluid, a fan mounted in front of said cooler, a second hydraulic motor operatively positioned on said cooler for rotating said fan so that air is propelled through said cooler thereby removing heat from the fluid flowing through said cooler, said second hydraulic motor receiving fluid from said first motor and delivering the aforesaid fluid into said cooler, a third hydraulic motor mounted on the front of said machine for operating said flailing means, said third motor receiving fluid from said pump, a fourth hydraulic motor mounted on the front of said machine for driving said conveying means, said fourth motor receiving fluid from said third motor and delivering the aforesaid fluid into said reservoir, and a fifth hydraulic motor mounted on a mid-portion side of said machine opposing said elevator for propelling said delivery means, said fifth motor receiving fluid from said pump and delivering the aforesaid fluid into said reservoir.

14. The improvement for the machine of claim 13 wherein said reservoir is disposed within the interior of said transverse beam, said reservoir being integral and substantially coextensive with the aforesaid beam.

15. The improvement for the machine of claim 13 further comprising a bypass valve interconnected between said first motor and said pump for selectively bypassing the fluid from said first motor.

16. The improvement for the machine of claim 15 further comprising means mounted on said tractor for activating said bypass valve.

17. The improvement for the machine of claim 13 wherein said pump comprises:

a first pump stage for delivering fluid from said reservoir into said first motor, a second pump stage for delivering fluid from said reservoir into said third motor, and a third pump stage for delivering fluid from said reservoir into said fifth motor.

18. The improvement for the machine of claim 13 wherein said third pump stage delivers substantially twice the flow rate of said first pump stage, said flow rate of said first pump chamber being substantially equal to the flow rate of said second pump stage.

* * * * *